Patented Apr. 16, 1935

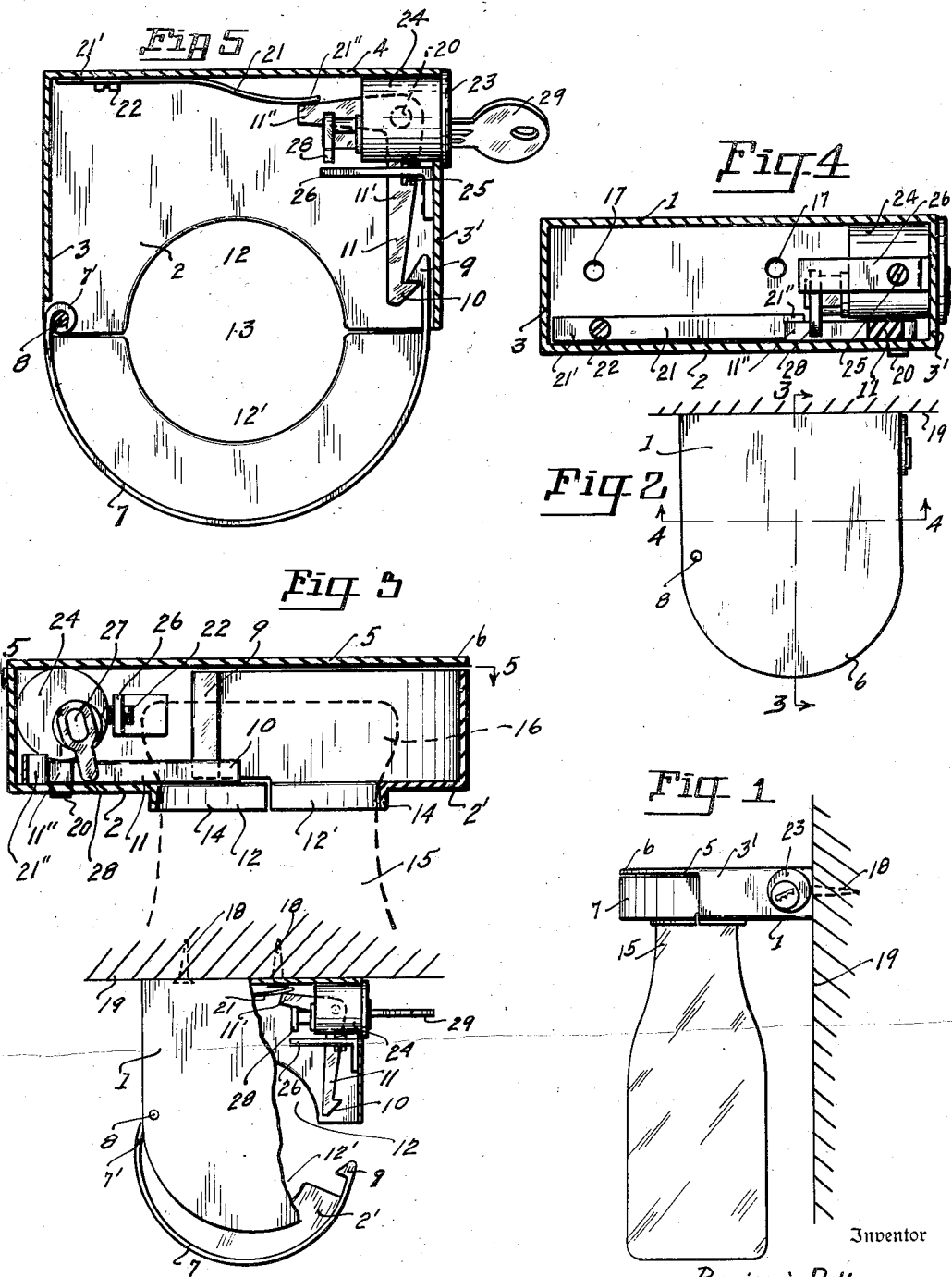

1,997,895

UNITED STATES PATENT OFFICE 1,997,895

MILK BOTTLE TOP LOCK

Benjamin P. Youmans, Vancouver, Wash.

Application December 11, 1933, Serial No. 701,845

3 Claims. (Cl. 232—41)

It is the almost invariable practice, at this time, to dispense lactic fluids in standardized containers or receptacles, usually formed of glass, and commonly referred to as milk bottles. The mouths of these bottles, regardless of their capacities, are uniform in size, usually being characterized by a tapering or conical neck portion terminating in a transversely rounded flange which defines such mouth. This uniformity is in order that a standardized cap or closure may be used for closing these receptacles.

The present invention makes use of the uniformity in milk bottle mouths above mentioned, and the purpose of the invention is to prevent the unauthorized removal or pilfering of milk delivered in bottles. To this end the invention relates to a holder in which the upper neck portion of a milk bottle may be secured. The bottle when so secured in the holder is locked against removal and only those possessing the proper key can unlock the controlling lock which will permit the release of the bottle. The holder is designed to be securely mounted to an upright support, such as a wall or the side of a house, and the means for so mounting are located within the holder so that when a bottle is secured therein it is practically impossible to remove the holder from its support.

The holder is so constructed that it entirely conceals the mouth of a bottle, thus not only preventing the unauthorized removal of milk from the bottle, but, in addition, protecting the bottle and its contents from the weather.

The invention embodies a small box like casing, the rear of which is securely fastened to a wall or other vertical support. The front of the casing forms a gate or swinging closure thereto. The bottom is divided into two portions one attached to the front closure, the other portion to the casing proper. The two bottom portions where they meet are cut out to fit about the neck portion of a milk bottle just below its mouth flange so that when the front is closed the flange rests upon the bottom portions defining the cut out regions. A lock is incorporated in the casing locking the closure or gate thereby preventing the removal, except by those who have an authorized key to the lock, of the bottle which is suspended by its neck or mouth flange from the casing. The casing entirely encloses the mouth portion of the bottle thus preventing unauthorized removal of its contents, as well as protecting it from the elements.

In the drawing—

Figure 1 is a side elevation of the invention which is shown supporting a milk bottle.

Figure 2 is an elevation of the invention.

Figure 3 is the sectional view indicated by section line 3—3 of Figure 2.

Figure 4 is the sectional view indicated by section line 4—4 of Figure 2.

Figure 5 is the sectional view indicated by section line 5—5 of Figure 4.

Figure 6 is a plan view with portions broken away, parts in section, and the closure or gate thereof partially opened.

The invention in its entirety consists of a casing or housing 1 which is formed of bottom 2, sides 3, 3', rear wall 4 and top 5. Top 5 projects beyond the bottom and sides and is rounded or curved at its front end as shown at 6. From the foregoing it will be seen that the front portion of the casing is open. For this is provided a gate, closure, swinging or pivoted gripping member, or clamping member 7. Member 7 has one end 7' pivotally connected to pin 8. Pin 8 has its ends firmly seated in the top and bottom members 5 and 2. Member 7 is curved to conform to the curvature of the end of top 5. The unpivoted end 7'' of member 7 when the latter is closed fits inside the side 3' and is provided with a catch 9 which is engaged by the catch 10 of the latch member 11, as shown in Figure 5, thereby preventing member 7 from being opened. Member 7 has attached to or continuing from its lower edge a bottom portion 2' supplementing the bottom 2. Both 2 and 2' constitute the bottom of the casing or housing, and where they meet they are rounded out or have curved indentations 12 and 12' respectively, and together providing a circular aperture 13 through the bottom of the casing. The edges of portions 2 and 2' defining the aperture 13 are curved downwardly to provide a strengthening flange as shown at 14. The foregoing constitutes the casing or housing proper, which may hereafter be referred to in its entirety as a clamp, holder, support, bracket, grip, protector and locking device, together with such modifying adjectives as this description shall warrant.

Aperture 13 has a transverse width sufficient to accommodate that portion of a milk bottle neck which is located immediately below the mouth flange or bead, such bead or flange resting upon the embracing portions of the bottom 2, 2'. This is shown in Figure 3 illustrating an outline bottle 15 having the required flange 16 which is seated as aforesaid. Casing 1 is provided with a number of screw holes 17 in the rear wall in which are inserted screws 18 which secure the casing to a wall or vertical support 19, the head of the screws being inside the casing where they are protected from tampering. The casing may be mounted to a vertical support or wall 19 in an elevated position in which event the bottle 15 will hang suspended by its bead or flange 16 from the member 1, as illustrated in Figure 1. Casing 1 is sufficiently large to entirely enclose the mouth portion 15' of bottle 15, thereby preventing unauthorized removal of the contents of such bottle as well as preventing the removal of the bottle itself. The latter being made certain by a locking mechanism incorporated in the casing which prohibits the opening of gate 7 except by those possessing the proper key to the control lock of the locking mechanism.

The locking mechanism referred to, not including the mechanism of a standard type of control lock used in conjunction with said mechanism, consists of the heretofore referred to latch 11. Latch 11 is an L-shaped member having two angularly positioned legs 11' and 11''. At the junction of the two legs is a downwardly directed pin 20 seating in a suitable aperture in the bottom 2 and upon which the latch 11 pivots thereby permitting catch 9 to engage or disengage catch 10 accordingly as leg 11' is moved to or from wall 3'. However, in order that there will be a constant endeavor for the catch 10 to engage catch 9, leg 11' must be constantly urged toward wall 3', and this constant urge is provided by means of a leaf spring 21 which has its one end 21' secured to the end 4 by means of a screw 22 and its other end 21'' urged outwardly and in engagement with leg 11'' of latch 11, thus in turn urging leg 11' toward side 3'. In order to control the latch 11 in order to produce a disengagement of catches 9 and 10, a control lock 23 is provided. This consists of a cylindrical lock case 24 which seats in an aperture provided therefor in side 3' where it is held stationary by a screw 25 which threads through stop 26 and into the casing 24. The location of screw 25 is such that it can only be threaded or unthreaded through the front of the casing when closure 7 is open. Stop 26, as will be seen, projects inwardly from side 3'. Lock 23 is provided with a barrel 27 which carries on its inner end a dog 28. It may again be stated that lock 23 is a standard or stock lock and may be considered as representing any type of control or master lock suitable for the herein described purpose. Barrel 27 is rotated by a suitable key 29 and such master keys as may be required by a distribution system making use of the bottle holder. Viewing Figure 3, when barrel 27 is rotated by key 29 clockwise, dog 28 will engage leg 11'' which thereupon moves toward end 4 thereby moving leg 11' away from side 3' and disengaging catches 9 and 10 and allowing closure 7 to be opened and bottle 15 removed. The stop 26 projects in the line of movement of dog 28 and prevents barrel 27, upon insertion of the key in the lock, being rotated contrary to that just described.

From the foregoing description the invention's many uses may readily be recognized. While it is susceptible of other uses, its prime usefulness will be found to be as an adjunct to milk delivery systems, especially in delivering milk to private homes, apartment houses, rooming houses, or elsewhere wherever individual delivery is required, as it will practically eliminate the danger of theft of the milk after it has been delivered. In this connection it may be assumed that the dealer or deliverer provides his customers with a locking holder and a key therefor. The holder is mounted adjacent the service or delivery door, as, for instance, to the door frame or adjacent wall by means of the screws 18 as heretofore set forth. The key provided the patron will unlock his bottle holder and none other. The deliveryman is provided with a master key which will master the locks on the holders in his particular route, thereby allowing him to unlock each holder and exchange the bottles. Practically the only unauthorized way in which the filled bottles may be removed from a holder is by picking the control lock, and this can be practically eliminated by using high grade locks. Removal of the holder from the wall or support will not give access to the contents of the bottle for the reason that its holder casing entirely surrounds the bottle mouth, and to endeavor to break the casing would in all probability destroy the bottle and its contents. Therefore, it will be seen that the holder provides a substantial safeguard for bottles and their contents.

Having described my invention, I claim—

1. A holder for milk bottles having a mouth bead or flange embodying a member having a top, bottom portion, rear and side walls, a pivoted closure closing the front of said member, said closure having a bottom portion supplementing the first mentioned bottom portion, said member having provision for securing its rear wall to a stationary support, said bottom portions having complementary cut out portions forming an aperture adapted to embrace that portion of a milk bottle immediately beneath the mouth bead in order that such bead seats upon the confining bottom portions, an L-shaped latch mounted in said member and having one leg engaging said closure and securing it against opening, a control lock mounted through one side of said member, a dog operated by said lock engaging the other leg of said latch, and said dog when operating moving said second leg thereby compelling the first leg to move out of engagement with said closure and permitting the closure to be opened and the bottle released.

2. A holder for milk bottles having a mouth bead or flange embodying a member having a top, bottom portions, rear and side walls, a pivoted closure closing the front of said member, said closure having a bottom portion supplementing the first mentioned bottom portion, said member having provision for being secured to a support, said bottom portions having complementary indentations adapted to embrace that portion of a milk bottle immediately beneath the mouth bead in order that such bead seats upon the surrounding bottom portions, an L-shaped latch formed of two angularly disposed leg members positioned within said member, said latch having a pin projecting downwardly in an aperture provided therefor in the first mentioned bottom portion, a control lock mounted through one side and immediately above said latch and maintaining said pin in its aperture, one leg of said latch engaging said closure and securing it against opening, a dog operated by said lock engaging the other leg of said latch, said dog when operating moving said second leg thereby compelling the first leg to move out of engagement with said closure and permitting the closure to be opened and the bottle released.

3. A holder for milk bottles having a mouth bead or flange embodying a member having a top, bottom portion, rear and side walls, a pivoted closure closing the front of said member, said closure having a bottom portion supplementing the first mentioned bottom portion, said member having provision for being secured to a support, said bottom portions having complementary indentations adapted to embrace that portion of a milk bottle immediately beneath the mouth bead in order that such bead seats upon the surrounding bottom portions, an L-shaped latch formed of two angularly disposed leg members positioned within said member, said latch having a pin projecting downwardly in an aperture provided therefor in said bottom portion, a control lock mounted through one side and immediately above said latch and maintaining said pin in its aperture, a stop projecting inwardly in said member, a screw threaded therethrough and into said lock and operating to retain said lock in its seat, one leg of said latch engaging said closure and securing it against opening, a dog operated by said lock engaging the other leg of said latch, and said dog when operating moving said second leg thereby compelling the first leg to move out of engagement with said closure and permitting the closure to be opened and the bottle released.

BENJAMIN P. YOUMANS.